(12) United States Patent
Kim (10) Patent No.: US 11,402,482 B2
(45) Date of Patent: Aug. 2, 2022

(54) VEHICLE RADAR APPARATUS AND CONTROL METHOD THEREOF

(71) Applicant: HYUNDAI MOBIS CO., LTD., Seoul (KR)

(72) Inventor: Young Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 62 days.

(21) Appl. No.: 16/783,553

(22) Filed: Feb. 6, 2020

(65) Prior Publication Data
US 2020/0256973 A1    Aug. 13, 2020

(30) Foreign Application Priority Data
Feb. 7, 2019   (KR) .................. 10-2019-0014429

(51) Int. Cl.
| | |
|---|---|
| *G01S 13/524* | (2006.01) |
| *G01S 1/38* | (2006.01) |
| *G01S 13/58* | (2006.01) |
| *G01S 13/931* | (2020.01) |
| *G01S 13/00* | (2006.01) |

(52) U.S. Cl.
CPC .............. *G01S 13/524* (2013.01); *G01S 1/38* (2013.01); *G01S 13/58* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 4,750,147 A | * | 6/1988 | Roy, III ................... | G01S 3/74 708/801 |
| 5,257,031 A | * | 10/1993 | Scarpetta ................. | H01Q 3/24 343/909 |
| 5,933,109 A | * | 8/1999 | Tohya .................. | G01S 13/931 342/175 |
| 5,936,575 A | * | 8/1999 | Azzarelli ............... | H01Q 21/24 342/362 |
| 6,377,213 B1 | * | 4/2002 | Odachi ..................... | G01S 3/48 342/372 |
| 6,762,711 B1 | * | 7/2004 | Doerfler ................ | G01S 13/931 342/149 |
| 7,092,673 B2 | * | 8/2006 | Bevan ................... | H04W 64/00 342/350 |
| 7,576,682 B1 | * | 8/2009 | Yu ............................. | G01S 3/74 342/90 |

(Continued)

FOREIGN PATENT DOCUMENTS

KR          10-0278142 B1     10/2000

*Primary Examiner* — Bernarr E Gregory
(74) *Attorney, Agent, or Firm* — NSIP Law (57) ABSTRACT

The vehicle radar apparatus may include a transmitting array antenna configured to radiate radar signals for forward detection, N receiving array antennas configured to receive the radar signals reflected from a target after being radiated from the transmitting array antenna, and a control unit configured to estimate an azimuth of the target by using non-offset receiving array antennas among the N receiving array antennas and estimate an elevation of the target by using a phase difference between an offset receiving array antenna and the non-offset receiving array antenna among the N receiving array antennas and the azimuth of the target.

11 Claims, 6 Drawing Sheets

(56) References Cited

U.S. PATENT DOCUMENTS

| | | | | |
|---|---|---|---|---|
| 2008/0122681 A1* | 5/2008 | Shirakawa | ............... | G01S 3/74 |
| | | | | 342/147 |
| 2009/0243933 A1* | 10/2009 | Shirakawa | ............... | G01S 3/74 |
| | | | | 342/417 |
| 2013/0272097 A1* | 10/2013 | Kim | ......................... | G01S 3/80 |
| | | | | 367/129 |
| 2016/0018509 A1* | 1/2016 | McCorkle | ................ | G01S 3/46 |
| | | | | 342/386 |
| 2016/0103199 A1* | 4/2016 | Rappaport | ............... | G01S 3/42 |
| | | | | 342/377 |
| 2017/0033876 A1* | 2/2017 | Oshima | ................... | H04B 7/04 |

* cited by examiner

VEHICLE RADAR APPARATUS AND CONTROL METHOD THEREOF

CROSS-REFERENCE TO RELATED APPLICATION

The present application claims priority under 35 U.S.C. § 119(a) to Korean (Republic of Korea) Patent Application No. 10-2019-0014429 filed on Feb. 7, 2019 in the Korean Intellectual Property Office, which is incorporated herein by reference in its entirety.

BACKGROUND

1. Technical Field

Embodiments of the present disclosure relate to a vehicle radar apparatus and a control method thereof.

2. Related Art

A radar refers to an apparatus that emits electromagnetic waves to an object, receives electromagnetic waves reflected from the object, and detects a distance to the object, a direction, a speed, an elevation and the like. Meanwhile, a vehicle radar has been developed for the purpose of ensuring driver's safety and is generally manufactured in a monolithic microwave integrated circuit (MMIC) structure employing a substrate antenna. Specifically, an MMIC for transmission, an MMIC for reception, and an MMIC for signal generation may be included in the vehicle radar, and the vehicle radar operates on the principle that the MMIC for signal generation generates a frequency signal of about 77 GHz, the MMIC for transmission transmits the frequency signal within a range for object detection, and the MMIC for reception receives the transmitted signal. Recently, there is a trend of integrating the MMIC for transmission, the MMIC for reception, and the MMIC for signal generation into one MMIC, and in the future, it is expected that the utilization of a radar on chip (ROC) will increase in which an ADC for converting an analog frequency signal into a digital signal and a processor for processing the converted digital signal to calculate information on an object are integrated into one MMIC.

Since the related art described above is technical information possessed by the inventor for the derivation of the present disclosure or acquired in the derivation process of the present disclosure, it may not be said to be a publicly known technique disclosed to the general public before filing the application for the present disclosure.

Patent Literature 1: Korean Patent No. 10-0278142.

SUMMARY

Various embodiments are directed to estimating an azimuth and an elevation without increasing the size of a radar.

Various embodiments are directed to increasing the degree of freedom of an antenna array structure and reducing a computation time by using equation-based elevation estimation.

In an embodiment, a vehicle radar apparatus may include: a transmitting array antenna configured to radiate radar signals for forward detection; N receiving array antennas configured to receive the radar signals reflected from a target after being radiated from the transmitting array antenna; and a control unit configured to estimate an azimuth of the target by using non-offset receiving array antennas among the N receiving array antennas and estimate an elevation of the target by using a phase difference between an offset receiving array antenna and the non-offset receiving array antenna among the N receiving array antennas and the azimuth of the target.

The control unit may include: an azimuth estimation section configured to estimate the azimuth of the target by using the non-offset receiving array antennas, except for the offset receiving array antennas, among the N receiving array antennas; and an elevation estimation section configured to estimate the elevation of the target by using a phase difference remaining by removing a phase difference occurring due to the azimuth from a phase difference between the radar signals received by one of the offset receiving array antennas and one of the non-offset receiving array antennas.

The control unit may further include an analog to digital converter (ADC) configured to convert the radar signals received from the N receiving array antennas into digital signals and output the digital signals to the azimuth estimation section.

The apparatus may further include a signal generation unit configured to generate a frequency signal to be provided to the transmitting array antenna.

In another embodiment, a control method of a vehicle radar apparatus may include: radiating, by a transmitting array antenna, radar signals for forward detection; receiving, by N receiving array antennas, radar signals reflected from a target after being radiated from the transmitting array antenna; and estimating, by a control unit, an azimuth of the target by using non-offset receiving array antennas among the N receiving array antennas and estimating an elevation of the target by using a phase difference between an offset receiving array antenna and the non-offset receiving array antenna among the N receiving array antennas and the azimuth of the target.

The estimating may include: estimating, by an azimuth estimation section, the azimuth of the target by using the non-offset receiving array antennas, except for the offset receiving array antennas, among the N receiving array antennas; and estimating, by an elevation estimation section, the elevation of the target by using a phase difference remaining by removing a phase difference occurring due to the azimuth from a phase difference between the radar signals received by one of the offset receiving array antennas and one of the non-offset receiving array antennas.

The estimating may further include converting, by an ADC, the radar signals received from the N receiving array antennas into digital signals and outputting the digital signals to the azimuth estimation section.

The method may further include generating, by a signal generation unit, a frequency signal to be provided to the transmitting array antenna.

In addition, other methods and other systems for implementing the present disclosure and computer programs for executing the methods may be further provided.

Other aspects, features, and advantages other than the above will be apparent from the following drawings, claims and detailed description of the disclosure.

According to the embodiments, it is possible to estimate an azimuth and an elevation without increasing the size of a radar.

Furthermore, it is possible to increase the degree of freedom of an antenna array structure and reduce a computation time by using equation-based elevation estimation.

The effects of the present disclosure are not limited to those mentioned above and other unmentioned effects will be clearly understood by those skilled in the art from the following description.

DETAILED DESCRIPTION

The advantages and features of the present disclosure and methods for achieving them will become readily apparent by reference to the following detailed description when considered in conjunction with the accompanying drawings. However, the present disclosure is not limited to embodiments to be described below, may be realized in various forms, and should be construed to include all modifications, equivalents, and alternatives falling within the spirit and scope of the disclosure. The embodiments to be described below are provided to bring the disclosure of the present disclosure to perfection and assist those skilled in the art to completely understand the scope of the present disclosure in the technical field to which the present disclosure pertains. Detailed descriptions related to well-known functions or configurations will be ruled out in order not to unnecessarily obscure subject matters of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components, or combinations thereof, but do not preclude the presence or addition of one or more other features, integers, steps, operations, elements, components, or combinations thereof. The terms such as first and second may be used to describe various elements, but the elements are not limited by the terms, and the terms are used only to distinguish one element from another element.

Hereafter, embodiments in accordance with the present disclosure will be described in detail with reference to the accompanying drawings. In the description with reference to the accompanying drawings, same or corresponding elements are denoted by the same reference numerals and redundant description thereof will be omitted.

Figure 1:
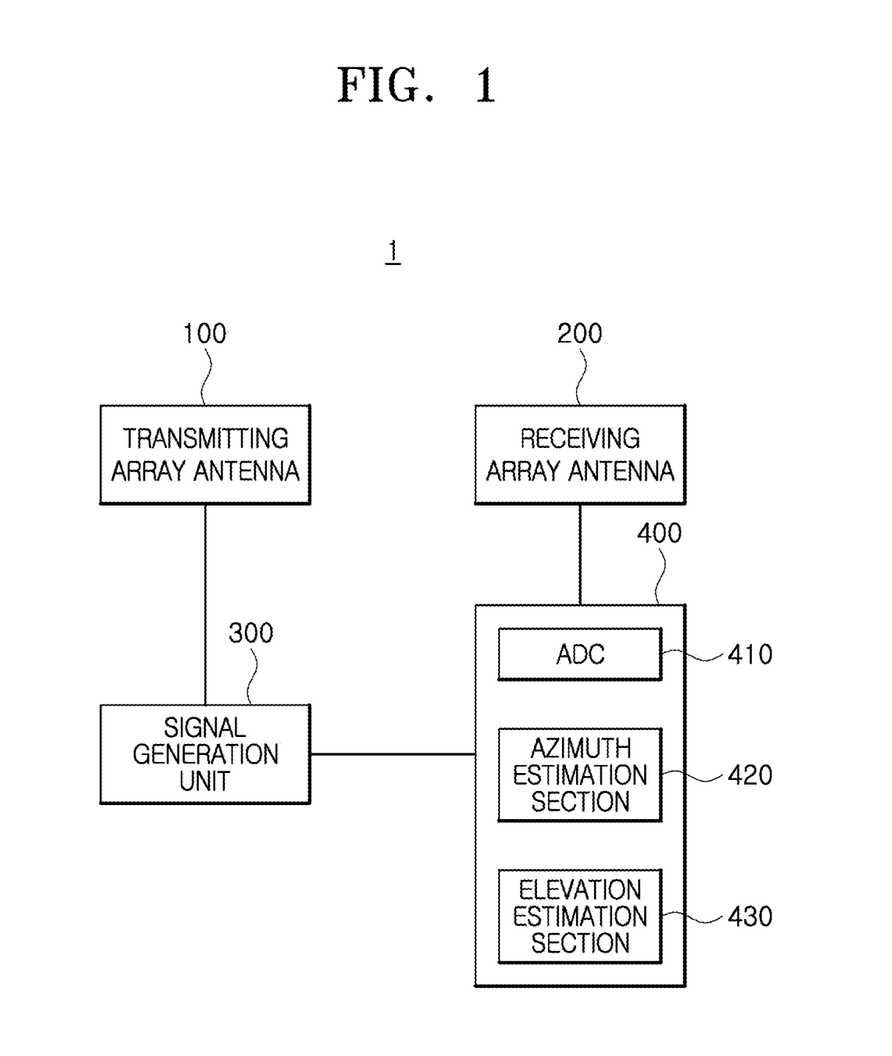
FIG. 1 is a diagram for schematically explaining a vehicle radar apparatus in accordance with an embodiment of the present disclosure.

FIG. 1 is a diagram for schematically explaining a vehicle radar apparatus 1 in accordance with an embodiment of the present disclosure. Referring to FIG. 1, the vehicle radar apparatus 1 may include a transmitting array antenna 100, N receiving array antennas 200, a signal generation unit 300, and a control unit 400.

As publicly known in the art, some of exemplary embodiments may be illustrated in the accompanying drawings from the viewpoint of function blocks, units, section, and/or modules. Those skilled in the art will understood that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification. Furthermore, each of the blocks, units and/or modules may be implemented by dedicated hardware or a combination of dedicated hardware for performing some functions and a processor for performing another function (for example, one or more programmed processors and related circuits). In some exemplary embodiments, each of the blocks, units and/or modules may be physically divided into two or more blocks, units and or modules which are interactive and discrete, without departing from the scope of the disclosure. Furthermore, blocks, units and/or modules in some exemplary embodiments may be physically coupled as a more complex block, unit and/or module without departing from the scope of the disclosure.

The transmitting array antenna 100 may have a configuration for radiating a radar signal for forward detection. The transmitting array antenna 100 may be composed of a plurality of channels, and the plurality of channels may be composed of a plurality of radiating elements, respectively.

The receiving array antenna 200 may include an azimuth channel (not illustrated), which, when the radar signal radiated from the transmitting array antenna 100 is reflected from a target in a forward azimuth direction, receives the reflected radar signal, and an elevation channel (not illustrated) which, when the radar signal radiated from the transmitting array antenna 100 is reflected from a clutter in a forward elevation direction, receives the reflected radar signal. The receiving array antenna 200 may also be composed of several channels like the transmitting array antenna 100.

The signal generation unit 300 may generate a frequency signal to be provided to the transmitting array antenna 100, under the control of the control unit 400. For example, the signal generation unit 300 may generate an ultra high frequency signal in the form of a frequency modulation continuous wave (FMCW).

Furthermore, the signal generation unit 300 may provide the receiving array antenna 200 with a reference signal corresponding to the frequency signal.

The control unit 400 may estimate an azimuth of the target by using a non-offset receiving array antenna among the N receiving array antennas 200, and estimate an elevation of the target by using a phase difference between an offset receiving array antenna and the non-offset receiving array antenna among the N receiving array antennas 200 and the azimuth of the target. The offset refers to a separation distance given in a vertical direction in order to estimate an elevation component and an offset range may be set by the control unit 400 according to an elevation identification range. Accordingly, being offset may indicate that there is a separation distance given in the vertical direction and being non-offset may indicate that there is no separation distance given in the vertical direction.

The vehicle radar apparatus 1 requires not only demands for an azimuth but also a function of identifying a target having an elevation, and needs to estimate both the azimuth and the elevation according to a limited size and the number of receiving array antennas 200. The vehicle radar apparatus 1 may use the receiving array antennas 200 in order to detect a target in the azimuth direction, and in order to estimate an elevation, one or more of the receiving array antennas 200 may be vertically spaced with an offset at predetermined intervals. The vehicle radar apparatus 1 may estimate an azimuth with a non-offset receiving array antenna 200, and use the azimuth to estimate an elevation based on the relation with an offset antenna.

Figure 2:
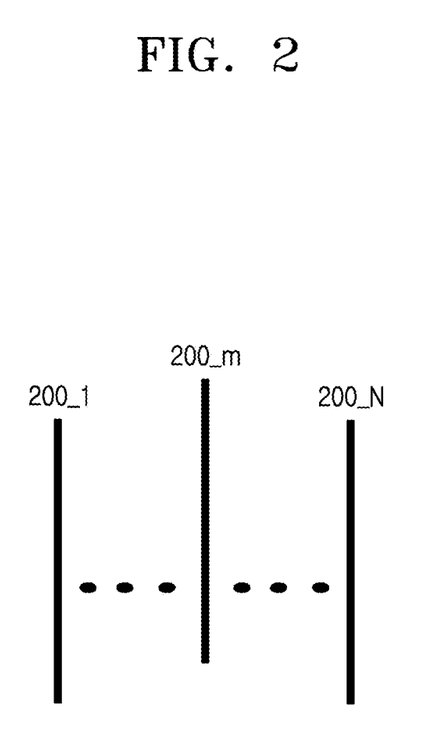
FIG. 2 is a diagram for schematically explaining the array of receiving array antennas of the vehicle radar apparatus of FIG. 1.

In the present embodiment, the control unit 400 may include an ADC 410, an azimuth estimation section 420, and an elevation estimation section 430. FIG. 2 is a diagram for schematically explaining the array of the N receiving array antennas 200, and the N receiving array antennas 200 may include an offset receiving array antenna 200_m and N−1 receiving array antennas 200_1 to 200_m−1 and 200_m+1 to 200_N except for the offset receiving array antenna 200_m. Herein, the number of offset receiving array antennas is limited to one, but this is for convenience of description only and the number of offset receiving array antennas may be two or more. Hereinafter, the reference numerals of the receiving array antennas 200 will be described with reference to FIG. 2.

The ADC 410 may convert radar signals received from the receiving array antennas 200 into digital signals and output the digital signals to the azimuth estimation section 420.

The azimuth estimation section 420 may estimate the azimuth of the target by using the N−1 non-offset receiving array antennas 200_1 to 200_m−1 and 200_m+1 to 200_N, except for the offset receiving array antenna (200_m of FIG. 2), among the N receiving array antennas 200_1 to 200_N. In the present embodiment, the azimuth estimation section 420 estimates the azimuth by using FIG. 3 below, but is not limited thereto and may estimate the azimuth by using various angle algorithms.

Figure 3:
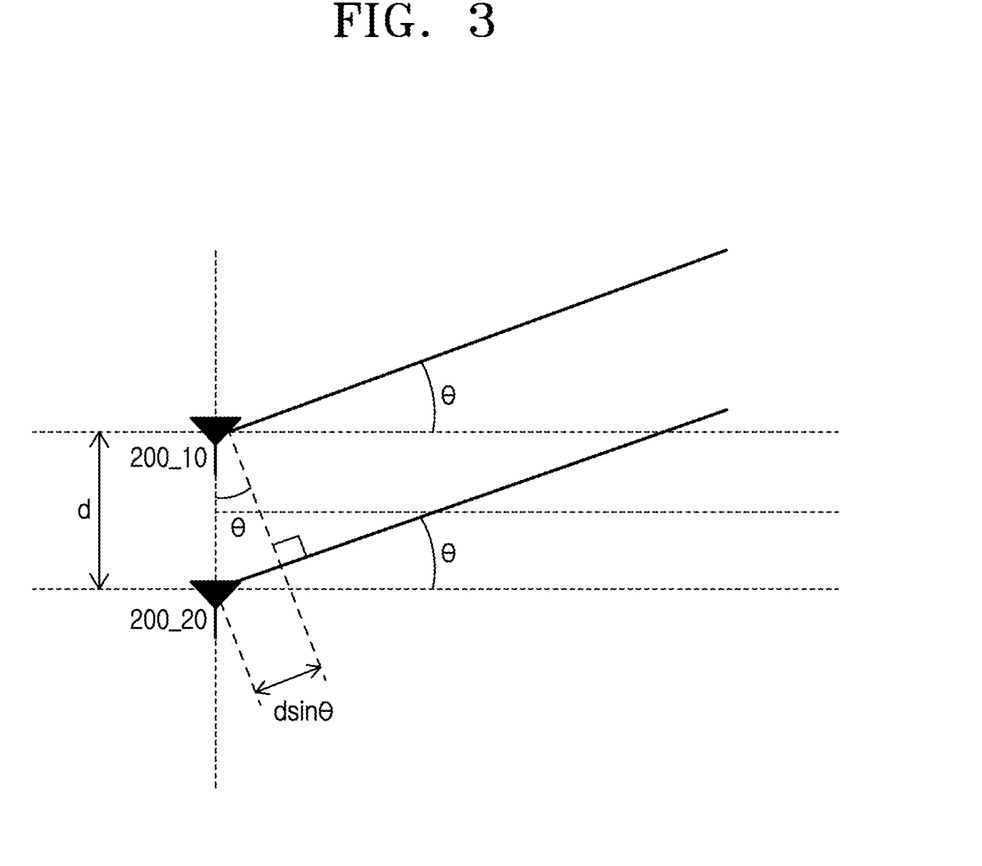
FIG. 3 is a diagram for schematically explaining azimuth estimation in accordance with an embodiment of the vehicle radar apparatus of FIG. 1.

FIG. 3 is a diagram for schematically explaining the azimuth estimation by the azimuth estimation section 420 in accordance with an embodiment of the present disclosure, and the azimuth estimation will be described using two receiving array antennas 200, for example, a first receiving array antenna 200_10 and a second receiving array antenna 200_20, among the N−1 non-offset receiving array antennas 200_1 to 200_m−1 and 200_m+1 to 200_N, except for the offset receiving array antenna (200_m of FIG. 2). In FIG. 3, the first receiving array antenna 200_10 and the second receiving array antenna 200_20 may be two antennas having a predetermined interval only in the vertical or horizontal direction.

A phase difference between the radar signals received from the first receiving array antenna 200_10 and the second receiving array antenna 200_20 may be calculated by Equation 1 below.

$$\Delta\phi = \phi_2 - \phi_1 = \frac{2\pi}{\lambda} d \sin\theta \qquad \text{Equation 1}$$

In Equation 1 above, $\phi_1$ may denote the phase of the radar signal received by the first receiving array antenna 200_10 after being reflected from the target, $\phi_2$ may denote the phase of the radar signal received by the second receiving array antenna 200_20 after being reflected from the target, $\Delta\phi$ may denote the phase difference, $\lambda$ may denote the wavelength of the received radar signal, d may denote an interval between the first receiving array antenna 200_10 and the second receiving array antenna 200_20, and $\theta$ may denote an azimuth.

When Equation 1 above is summarized as sine, Equation 2 below may be obtained.

$$\sin\theta = \frac{\lambda}{2\pi} \frac{\Delta\phi}{d} \qquad \text{Equation 2}$$

When Equation 2 above is summarized as $\theta$, Equation 3 below may be obtained, and $\theta$, which is the azimuth of the target, may be estimated from Equation 3 below.

$$\theta = \sin^{-1}\left(\frac{\lambda}{2\pi} \frac{\Delta\phi}{d}\right) \qquad \text{Equation 3}$$

In Equation 3 above, as the vertical interval or horizontal interval d between the first receiving array antenna 200_10 and the second receiving array antenna 200_20 increases, the range of the azimuth $\theta$ may be narrowed.

The elevation estimation section 430 may estimate the elevation of the target by using a phase difference remaining by removing a phase difference occurring due to the azimuth estimated by the azimuth estimation section 420 from the phase difference between a radar signal received by one 200_m of the offset receiving array antennas among the N receiving array antennas 200 and a radar signal received by one (for example, 200_N) of the N−1 non-offset receiving array antennas 200_1 to 200_m−1 and 200_m+1 to 200_N, except for the offset receiving array antenna 200_m, among the N receiving array antennas 200.

Figure 4:
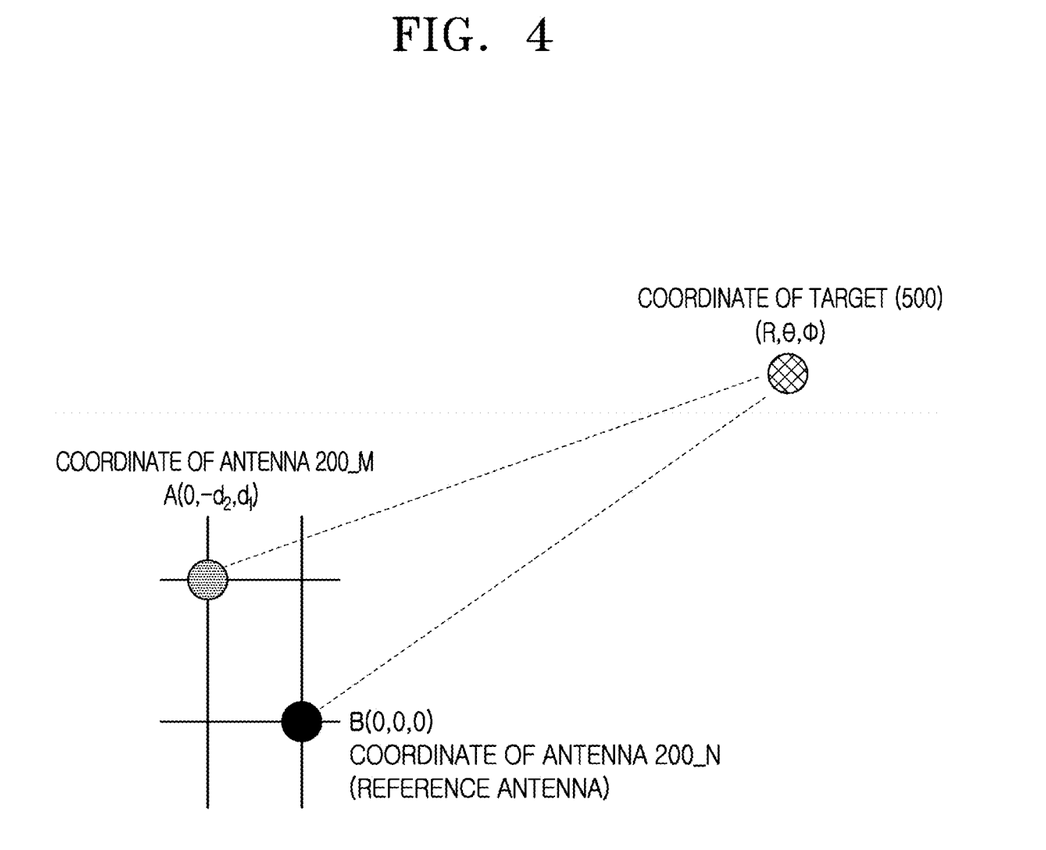
FIG. 4 is a diagram for schematically explaining elevation estimation of the vehicle radar apparatus of FIG. 1.

FIG. 4 is a diagram for schematically explaining the elevation estimation by the elevation estimation section 430 in accordance with an embodiment of the present disclosure, and illustrates the offset receiving array antenna 200_m, the non-offset receiving array antenna 200_N, and a target 500. The offset receiving array antenna 200_m and the non-offset receiving array antenna 200_N may be two antennas having a predetermined interval in the horizontal and vertical directions. Furthermore, the non-offset receiving array antenna 200_N may be a reference receiving array antenna, and any one of the N−1 non-offset receiving array antennas may be set as the reference receiving array antenna. From FIG. 5, the offset receiving array antenna 200_m, the non-offset receiving array antenna 200_N, and the target (for example, a road sign, 500) may include coordinate information.

The coordinate information of the non-offset receiving array antenna 200_N as the reference receiving array antenna may be the origin (0, 0, 0), and the coordinate information of the offset receiving array antenna 200_m may include distance coordinate information (0, −d_2, d_1) indicating how far it is from the non-offset receiving array antenna 200_N. Both the coordinate information of the offset receiving array antenna 200_m and the coordinate information of the non-offset receiving array antenna 200_N may indicate a distance and the unit thereof may be [m]. The coordinate information of the target 500 may include (R, $\theta$, $\phi$), wherein R may denote a distance between the non-offset receiving array antenna 200_N as the reference receiving array antenna and the target 500, θ may denote the azimuth, and φ may denote the elevation.

From FIG. 4, a physical distance RA between the target 500 and the offset receiving array antenna 200_m may be calculated by Equation 4 below.

$$RA = R + d_2 \cos\phi \sin\theta - d_1 \sin\phi \qquad \text{Equation 4}$$

In Equation 4 above, $d_2$ may denote a vertical offset value of the offset receiving array antenna 200_m, $d_1$ may denote a horizontal interval between the offset receiving array antenna 200_m and the non-offset receiving array antenna 200_N as the reference receiving array antenna, R may denote the physical distance between the non-offset receiving array antenna 200_N as the reference receiving array antenna and the target 500, θ may denote the azimuth of the target estimated by the azimuth estimation section 420, and φ may denote the elevation of the target.

Furthermore, since a distance RB between the non-offset receiving array antenna 200_N and the target 500 is R, the elevation estimation section 430 may calculate a distance difference between the two antennas (the offset receiving array antenna 200_m and the non-offset receiving array antenna 200_N) and the target 500 through Equation 5 below.

$$RA - RB = \Delta l = d_2 \cos\phi \sin\theta - d_1 \sin\phi, \quad \Delta l = \frac{\lambda}{2\pi}\Delta\phi \qquad \text{Equation 5}$$

In Equation 5 above, Δφ may denote the phase difference between the radar signals received by the offset receiving array antenna 200_m and the non-offset receiving array antenna 200_N. Furthermore, the azimuth θ is a value estimated using the N−1 non-offset receiving array antennas 200_1 to 200_m−1 and 200_m+1 to 200_N, except for the offset receiving array antenna 200_m, among the N receiving array antennas 200, and when k is assumed as sine and Equation 5 is summarized, Equation 6 below may be derived.

$$kd_2 \cos\phi - d_1 \sin\phi = \Delta l \qquad \text{Equation 6}$$

In Equation 6 above, since the phase difference is used to estimate the azimuth θ and the azimuth θ is assumed as a constant k, it can be seen that the azimuth θ has been removed from Equation 6. When Equation 6 is summarized, assuming $kd_2$ as a and $-d_1$ as b, Equation 7 below is obtained.

$$a \cos\phi + b \sin\phi = \Delta l \qquad \text{Equation 7}$$

When Equation 7 above is summarized as elevation φ, Equation 8 below is obtained.

$$\phi = \alpha - \cos^{-1}\left(\frac{\Delta l}{\sqrt{a^2 + b^2}}\right), \quad \alpha = \tan^{-1}\left(\frac{b}{a}\right) \qquad \text{Equation 8}$$

Figure 5:
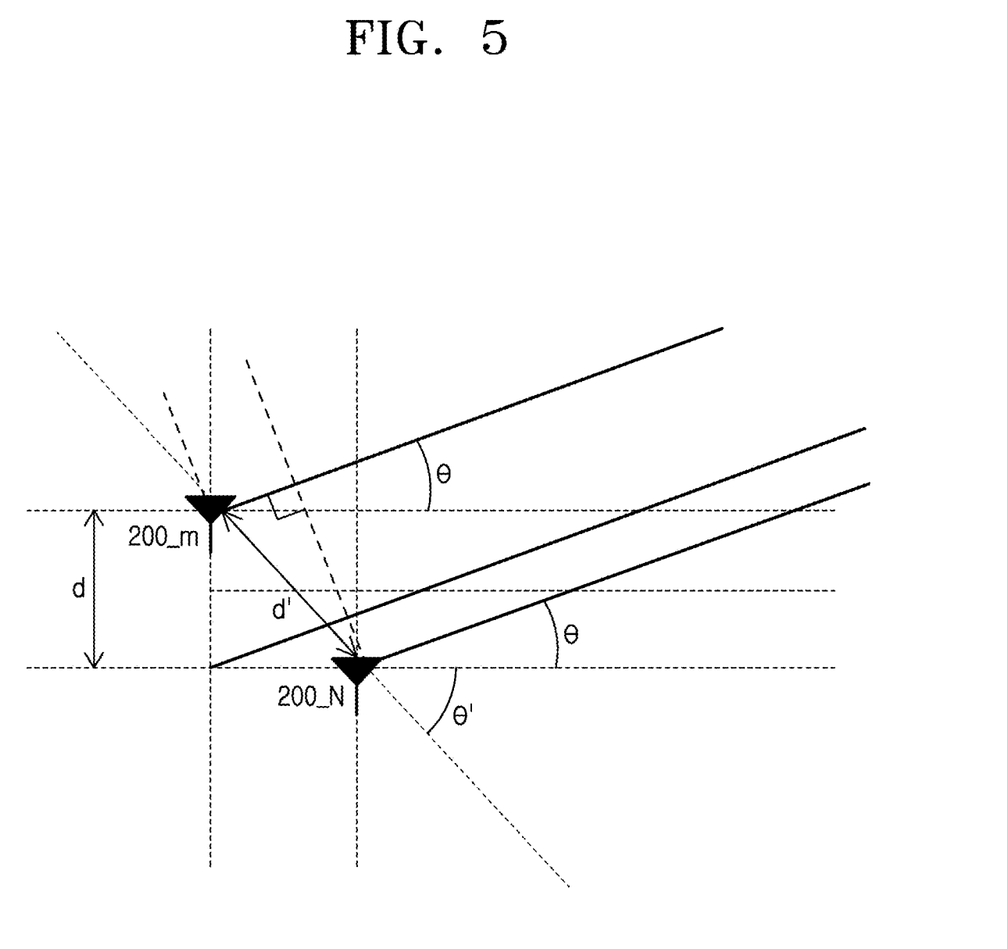
FIG. 5 is a diagram for schematically explaining determination regarding whether an angle of an azimuth according to an interval between receiving array antennas of the vehicle radar apparatus of FIG. 1 is valid.

FIG. 5 is a diagram for schematically explaining determination regarding whether the angle of the azimuth according to an interval between the receiving array antennas of the vehicle radar apparatus of FIG. 1 is valid, and the determination may be performed by the elevation estimation section 430. From FIG. 5, the elevation estimation section 430 may determine whether the angle of the azimuth is valid by using the offset receiving array antenna (200_m of FIG. 2) and one 200_N of the N−1 non-offset receiving array antennas 200_1 to 200_m−1 and 200_m+1 to 200_N, except for the offset receiving array antenna (200_m of FIG. 2). In FIG. 5, the offset receiving array antenna (200_m of FIG. 2) and the non-offset receiving array antenna 200_N may be two antennas having a predetermined interval in the horizontal and vertical directions.

The phase difference between the radar signals received by the offset receiving array antenna 200_m and the non-offset receiving array antenna 200_N may be calculated by Equation 9 below.

$$\Delta\phi' = \phi'_2 - \phi'_1 = \frac{2\pi}{\lambda} d' \cos(\theta + \theta') \qquad \text{Equation 9}$$

In Equation 9 above, $\phi'_1$ may denote the phase of the radar signal received by the offset receiving array antenna 200_m after being reflected from the target, $\phi'_2$ may denote the phase of the radar signal received by the non-offset receiving array antenna 200_N after being reflected from the target, Δφ' may denote the phase difference, λ may denote the wavelength of the received radar signal, d' may denote an interval between the offset receiving array antenna 200_m and the non-offset receiving array antenna 200_N, θ may denote the azimuth estimated by the azimuth estimation section 420, and θ' may denote an angle between the offset receiving array antenna 200_m and the non-offset receiving array antenna 200_N.

When Equation 9 above is summarized as cos(θ+θ'), Equation 10 below may be obtained.

$$\cos(\theta + \theta') = \frac{\lambda}{2\pi} \frac{\Delta\phi'}{d'} \qquad \text{Equation 10}$$

When Equation 10 above is summarized as (θ+θ'), Equation 11 below is obtained.

$$(\theta + \theta') = \cos^{-1}\left(\frac{\lambda}{2\pi} \frac{\Delta\phi'}{d'}\right) \qquad \text{Equation 11}$$

Equation 11 above may be considered to represent the relation among the azimuth θ estimated by the azimuth estimation section 420, the angle θ' between the offset receiving array antenna 200_m and the non-offset receiving array antenna 200_N, the phase difference Δφ', and the interval d' between the offset receiving array antenna 200_m and the non-offset receiving array antenna 200_N, when the offset receiving array antenna 200_m and the non-offset receiving array antenna 200_N are disposed in the vertical and horizontal directions (diagonal direction).

Based on FIG. 5, whether the range of the azimuth θ is valid may be determined by the vertical interval and horizontal interval d' as the diagonal distance between the offset receiving array antenna 200_m and the non-offset receiving array antenna 200_N and the angle θ' between the offset receiving array antenna 200_m and the non-offset receiving array antenna 200_N. Equation 12 below discloses an Equation for determining whether the range of the azimuth θ is valid.

$$-\pi \leq \Delta\phi' = \phi'_2 - \phi'_1 = \frac{2\pi}{\lambda} d' \cos(\theta + \theta') \leq \qquad \text{Equation 12}$$

-continued $$\pi - \cos^{-1}\left(\frac{\lambda}{2d'}\right) \le (\theta + \theta') \le \cos^{-1}\left(\frac{\lambda}{2d'}\right)$$

$$|\theta + \theta'| \le \cos^{-1}\left(\frac{\lambda}{2d'}\right)$$

$$d' \uparrow \Rightarrow \cos^{-1}\left(\frac{\lambda}{2d'}\right) \downarrow \Rightarrow |\theta + \theta'| \downarrow$$

When the angle θ' between the offset receiving array antenna 200_m and the non-offset receiving array antenna 200_N and the vertical interval and horizontal interval d' as the diagonal distance between the offset receiving array antenna 200_m and the non-offset receiving array antenna 200_N are calculated from Equation 12 above, the valid range of the azimuth θ may be determined. The valid range of the azimuth θ may be determined in consideration of the fact that the phase difference between the received signals of the offset receiving array antenna 200_m and the non-offset receiving array antenna 200_N is 0 to 2μ. As the interval d' between the offset receiving array antenna 200_m and the non-offset receiving array antenna 200_N increases, the range of the azimuth θ that may be estimated may be narrowed.

Figure 6:
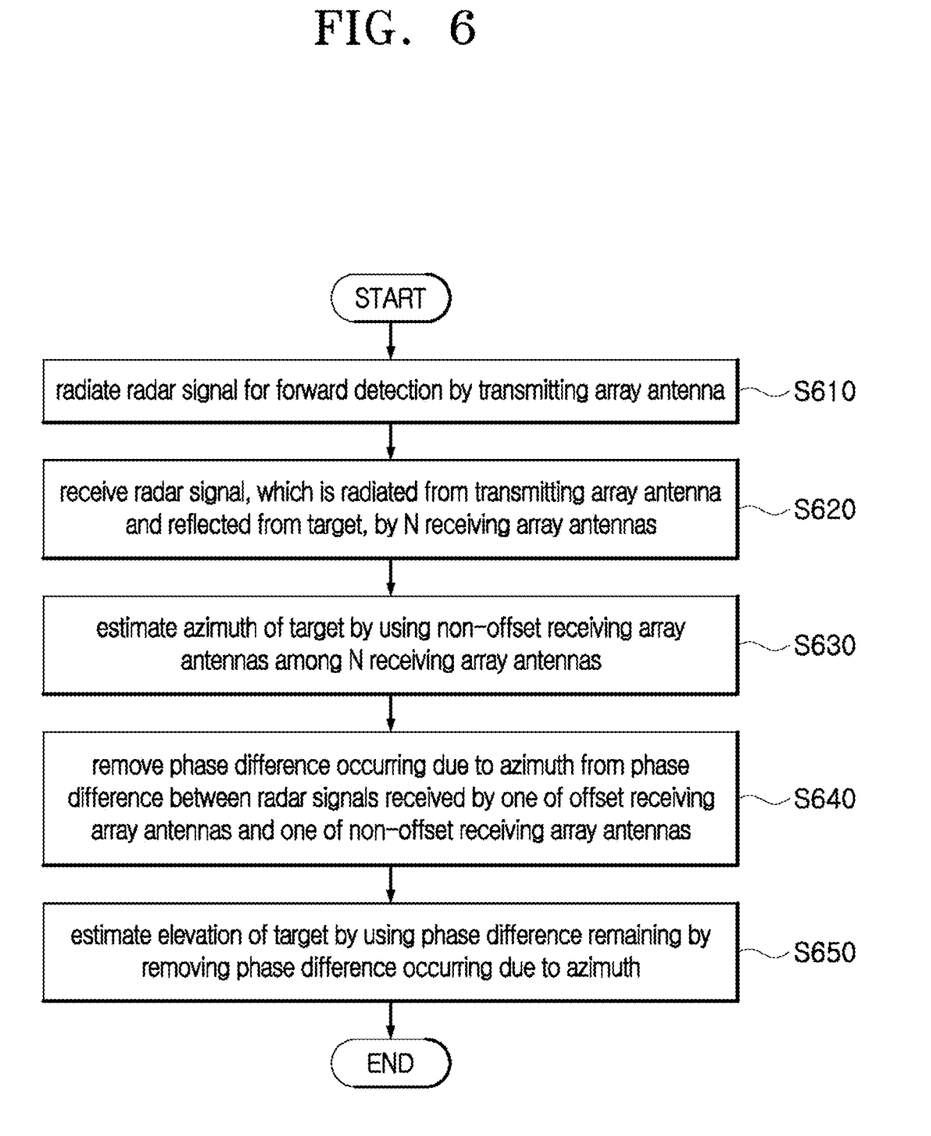
FIG. 6 is a flowchart for explaining a control method of the vehicle radar apparatus in accordance with an embodiment of the present disclosure.

FIG. 6 is a flowchart for explaining a control method of the vehicle radar apparatus in accordance with an embodiment of the present disclosure. In the following description, a description of parts overlapping the description of FIG. 1 to FIG. 5 will be omitted.

Referring to FIG. 6, in step S610, the vehicle radar apparatus 1 radiates the radar signal for forward detection by the transmitting array antenna 100.

In step S620, the vehicle radar apparatus 1 receives the radar signal, which is radiated from the transmitting array antenna 100 and reflected from the target, by the N receiving array antennas 200.

In step S630, the vehicle radar apparatus 1 estimates the azimuth of the target by using the N−1 non-offset receiving array antennas 200_1 to 200_m−1 and 200_m+1 to 200_N, except for the offset receiving array antenna 200_m, among the N receiving array antennas 200_1 to 200_N. The azimuth of the target may be estimated using the aforementioned Equation 1 to Equation 3.

In step S640, the vehicle radar apparatus 1 removes a phase difference occurring due to the azimuth from the phase difference between the radar signals received by one 200_m of the offset receiving array antennas and one 200_N of the non-offset receiving array antennas.

In step S650, the vehicle radar apparatus 1 estimates the elevation of the target by using the phase difference remaining by removing the phase difference occurring due to the azimuth from the phase difference between the radar signals received by one 200_m of the offset receiving array antennas and one 200_N of the non-offset receiving array antennas.

The embodiment of the present disclosure described above may be implemented in the form of a computer program executable through various components on a computer, and the computer program may be recorded on a computer readable medium. The medium may include a magnetic medium such as a hard disk, a floppy disk, and a magnetic tape, an optical recording medium such as a CD-ROM and a DVD, a magnoto-optical medium such as a floptical disk, and a hardware device, such as a ROM, a RAM, and a flash memory, which is specially configured to store and execute program instructions.

Meanwhile, the computer program may be specially designed and configured for the present disclosure or may be known to and available by those skilled in a computer software field. An example of the computer program may include not only machine language codes generated by a compiler, but also high-level language codes executable by a computer using an interpreter and the like.

In the specification (particularly, in the claims) of the present disclosure, the use of the term "the" and an indication term similar thereto may correspond to both the singular and the plural. Furthermore, in the present disclosure, when a range is described, it includes the disclosure employing individual values belonging to the range (unless otherwise defined) and is the same as describing each individual value constituting the range in the detailed description of the disclosure.

When an order is clearly stated for steps constituting the method in accordance with the present disclosure or there is no contrary description, the steps may be executed in a suitable order. The present disclosure is not necessarily limited to the description order of the steps. In the present disclosure, the use of all examples or exemplary terms (for example, and the like) is for specifically describing the present disclosure, and the scope of the present disclosure is not limited by the examples or exemplary terms unless limited by the claims. Furthermore, those skilled in the art may recognize that various modifications, combinations, and changes may be made depending on design conditions and factors within the scope of the appended claims or equivalents thereto.

Accordingly, the spirit of the present disclosure should not be limited to the aforementioned embodiment and not only the claims to be described later but also all ranges equivalent to the claims or equivalently changed from the claims fall within the scope of the scope of the present disclosure.

What is claimed is:

1. A vehicle radar apparatus comprising:
a transmitting array antenna configured to radiate radar signals for forward detection;
N receiving array antennas configured to receive the radar signals reflected from a target after being radiated from the transmitting array antenna; and
a controller configured to estimate an azimuth of the target using non-offset receiving array antennas from among the N receiving array antennas,
wherein the non-offset receiving array antennas comprise antennas having no offset in a vertical direction from among the N receiving array antennas.

2. The vehicle radar apparatus according to claim 1, wherein the controller is further configured to estimate an elevation of the target using a phase difference between an offset receiving array antenna from among the N receiving array antennas and the non-offset receiving array antenna and the azimuth of the target,
wherein the offset receiving array antenna comprise an antenna having an offset in a vertical direction from the non-offset receiving array antennas.

3. The vehicle radar apparatus according to claim 2, wherein the controller comprises:
an azimuth estimator configured to estimate the azimuth of the target using the non-offset receiving array antennas, except for the offset receiving array antennas, among the N receiving array antennas; and
an elevation estimator configured to estimate the elevation of the target using a phase difference remaining by removing a phase difference occurring due to the azimuth from a phase difference between the radar signals received by one of the offset receiving array antennas and one of the non-offset receiving array antennas.

4. The vehicle radar apparatus according to claim 3, wherein the controller further comprises:
an analog to digital converter (ADC) configured to convert the radar signals received from the N receiving array antennas into digital signals and output the digital signals to the azimuth estimator.

5. The vehicle radar apparatus according to claim 1, further comprising:
a signal generator configured to generate a frequency signal to be provided to the transmitting array antenna.

6. A control method of a vehicle radar apparatus, the control method comprising:
radiating, by a transmitting array antenna, radar signals for forward detection;
receiving, by N receiving array antennas, radar signals reflected from a target after being radiated from the transmitting array antenna; and
estimating, by a controller, an azimuth of the target using non-offset receiving array antennas from among the N receiving array antennas,
wherein the non-offset receiving array antennas comprise antennas having no offset in a vertical direction from among the N receiving array antennas.

7. The control method according to claim 6, wherein the estimating further comprises:
estimating, by the controller, an elevation of the target using a phase difference between an offset receiving array antenna from among the N receiving array antennas and the non-offset receiving array antenna and the azimuth of the target,
wherein the offset receiving array antenna comprise an antenna having an offset a vertical direction from the non-offset receiving array antennas.

8. The control method according to claim 7, wherein the estimating of the azimuth comprises:
estimating, by an azimuth estimator, the azimuth of the target by using the non-offset receiving array antennas, except for the offset receiving array antennas, among the N receiving array antennas.

9. The control method according to claim 8, wherein the estimating further comprises:
converting, by an analog to digital converter (ADC), the radar signals received from the N receiving array antennas into digital signals and outputting the digital signals to the azimuth estimator.

10. The control method according to claim 7, wherein the estimating of the elevation comprises:
estimating, by an elevation estimator, the elevation of the target by using a phase difference remaining by removing a phase difference occurring due to the azimuth from a phase difference between the radar signals received by one of the offset receiving array antennas and one of the non-offset receiving array antennas.

11. The control method according to claim 6, further comprising:
generating, by a signal generator, a frequency signal to be provided to the transmitting array antenna.

* * * * *